United States Patent [19]
McIntyre et al.

[11] Patent Number: 6,014,165
[45] Date of Patent: Jan. 11, 2000

[54] APPARATUS AND METHOD OF PRODUCING DIGITAL IMAGE WITH IMPROVED PERFORMANCE CHARACTERISTIC

[75] Inventors: Dale F. McIntyre, Honeoye Falls; John A. Weldy, Rochester, both of N.Y.; Jennifer C. Loveridge, North Harrow, United Kingdom

[73] Assignee: Eastman Kodak Company, Rochester, N.Y.

[21] Appl. No.: 08/796,349

[22] Filed: Feb. 7, 1997

[51] Int. Cl.[7] .................................................. H04N 7/18
[52] U.S. Cl. ............................................. 348/64; 396/429
[58] Field of Search .............................. 348/64; 396/429, 396/76, 77; 382/284, 294, 167; 355/18

[56] References Cited

U.S. PATENT DOCUMENTS

| | | | |
|---|---|---|---|
| 4,689,696 | 8/1987 | Plummer | 386/43 |
| 4,714,962 | 12/1987 | Levine | 348/64 |
| 5,130,745 | 7/1992 | Cloutier et al. | 355/40 |
| 5,450,149 | 9/1995 | Cocca | 396/320 |
| 5,502,528 | 3/1996 | Czarnecki et al. | 396/319 |
| 5,668,595 | 9/1997 | Katayama et al. | 348/218 |
| 5,687,412 | 11/1997 | McIntyre | 396/319 |
| 5,706,416 | 1/1998 | Mann et al. | 345/427 |
| 5,748,258 | 5/1998 | Tanji | 348/625 |
| 5,749,006 | 5/1998 | McIntyre et al. | 396/310 |
| 5,786,847 | 4/1998 | Katayama et al. | 348/47 |
| 5,828,793 | 10/1998 | Mann | 382/284 |
| 5,940,641 | 8/1999 | McIntyre et al. | 396/332 |

FOREIGN PATENT DOCUMENTS

| | | | |
|---|---|---|---|
| WO 91/00667 | 5/1990 | WIPO | 1/46 |

OTHER PUBLICATIONS

Image Processing, edited by D. Pearson, Chapter 3, "Motion and Motion Estimation," G. Thomas, pp. 40–57, McGraw–Hill, 1991.

Chapter 3 of "Theory and Application of Digital Signal Processing", Rabiner & Gold, Prentice–Hall 1975.

W.K. Pratt, Digital Image Processing, pp. 50–93, Wiley Interscience Jan. 1978.

*Primary Examiner*—Wendy Garber
*Assistant Examiner*—Jacqueline Wilson
*Attorney, Agent, or Firm*—Raymond L. Owens

[57] ABSTRACT

A digital image with improved performance characteristics is formed by producing a photographic image of a scene; producing a digitized electronic image of the same scene; scanning the photographic image to produce a digitized photographic image of a scene; and combining and processing the digitized electronic image and the digitized photographic image to produce another digitized image with improved performance characteristics.

9 Claims, 6 Drawing Sheets

APPARATUS AND METHOD OF PRODUCING DIGITAL IMAGE WITH IMPROVED PERFORMANCE CHARACTERISTIC

CROSS REFERENCE TO RELATED APPLICATIONS

The present invention is related to U.S. patent application Ser. No. 08/672,390 filed May 29, 1996 to McIntyre et al entitled "A Camera for Recording Images on a Photographic Film or on a Magnetic Tape"; U.S. patent application Ser. No. 08/641,709 filed May 2, 1996 to K. R. Hailey et al entitled "Digital Signal Processing for Implementation of Continuous Zoom With Sub-Pixel Accuracy"; U.S. patent application Ser. No. 08/334,985, filed Nov. 7, 1994 to J. C. Loveridge entitled "Detection of Global Translations Between Images"; and U.S. patent application Ser. No. 08/637,116, filed Apr. 24, 1996 to McIntyre et al entitled "A Non-Photographic Strip Having a Base Layer Similar to a Photographic Filmstrip and a Magnetic Recording Layer"; U.S. patent application Ser. No. 08/796,350, filed Feb. 7, 1997 to Weldy et al entitled "Method of Producing Digital Images With Improved Performance Characteristic"; and U.S. patent application Ser. No. 08/796,348 filed Feb. 7, 1997 to Loveridge et al entitled "Method of Producing Digital Image With Improved Performance Characteristic", assigned to the assignee of the present invention. The disclosure of these related applications is incorporated herein by reference.

FIELD OF THE INVENTION

The present invention relates to producing improved digital images which can, for example, be produced by hybrid cameras.

BACKGROUND OF THE INVENTION

It is conventional to capture photographic images on a photographic film by means of a standard photographic camera. Also electronic images are captured by electronic cameras on image sensors such as charged coupled devices (CCD). These systems each are characterized by a number of advantages and a number of limitations. Photographic images are typically of high resolution but may have noise associated with film grain. In addition photographic film may have low sensitivity to light, thus limiting the circumstances in which it can be used with optimum performance. Image sensors, on the other hand, tend to have a high sensitivity to light, and a different noise characteristic to that associated with photographic film, but will typically produce an image of substantially lower resolution than the photographic image.

SUMMARY OF THE INVENTION

It is an object of the present invention to provide improved digital images by optimizing the advantages of different image capture devices or media and eliminate the problems noted above.

This object is achieved by a method of producing a digital image with improved performance characteristics, comprising the steps of:

a) producing a photographic image of a scene;
b) producing a digitized electronic image of the same scene;
c) scanning the photographic image to produce a digitized photographic image of the scene; and
d) combining and processing the digitized electronic image and the digitized photographic image to produce another digital image with improved performance characteristics.

ADVANTAGES

Digital images produced in accordance with the present invention combine the features of photographic and electronic images to produce improved images.

By combining and processing electronic and digitized photographic images an improved digital image can be produced which is superior to either of the digitized electronic and digitized photographic images.

DETAILED DESCRIPTION OF THE DRAWINGS

DETAILED DESCRIPTION OF THE INVENTION

Figure 1:
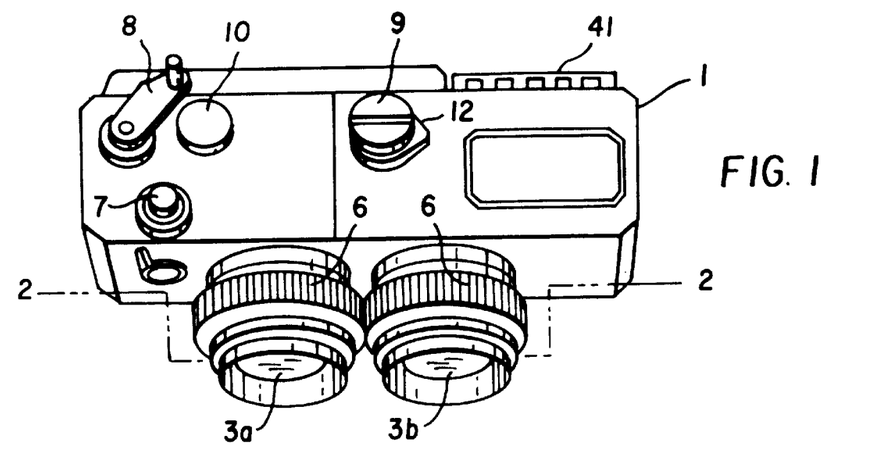
FIG. 1 is a perspective view of a hybrid dual lens camera in accordance with the present invention.

By use of the term hybrid camera it is meant that there are at least two separate imaging capture media such as forming an image on a photographic film and on an electronic image sensor. Turning now to FIG. 1, there is shown a hybrid dual lens camera having a hybrid camera main body 1; camera lenses 3a and 3b; focusing mechanisms 6; a shutter switch including a self-return push-button switch 7; a wind-up lever 8; a shutter speed dial 9; a film rewind knob 10; and a film sensitivity dial 12. These components are the same as those in a normal camera.

Figure 2A:
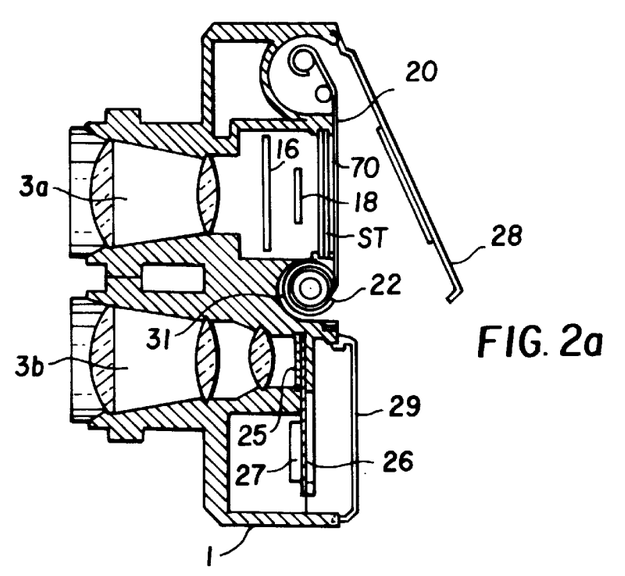
FIG. 2a is a cross sectional view of the camera shown in FIG. 1 taken along the lines 2—2.

Turning now to FIG. 2a which is a cross sectional view which depicts a hybrid camera which includes a through the lens (TTL) automatic exposure function (not shown), and has a normal structure including a reflex mirror 16, submirror 18, shutter curtain ST, film 20 disposed in a film cartridge 22. The film cartridge 22 is removable from the camera body and a new film cartridge 22, having substantially the same design as the film cartridge, can be inserted into the camera body. This new cartridge includes a magnetic tape. When this cartridge is used, a linear magnetic head array 36 is activated.

Figure 2B:
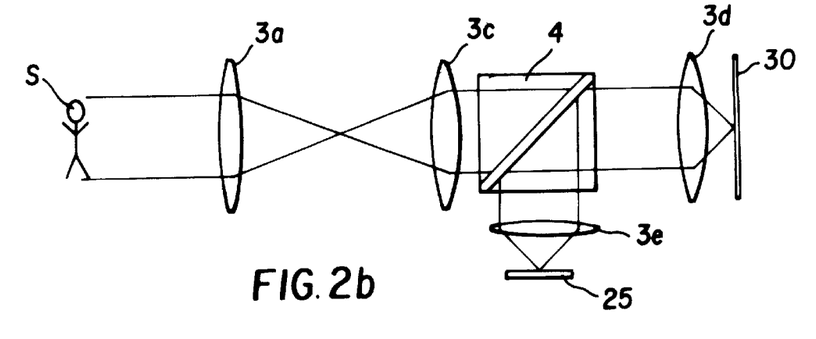
FIG. 2b shows a beam splitter arrangement which eliminates the requirement for two separate lens systems in the camera of FIG. 1.

Turning now to FIG. 2b which shows a beam splitter arrangement which can be used instead of one of the focusing lens 3d shown in FIG. 2a. In this embodiment, the camera lens 3a causes an image to be projected onto collimating lens 3c which projects a collimated beam of light to a beam splitter 4. The beam splitter 4 splits the image in two directions which are at right angles to each other. A focusing lens 3d focuses one of the beam splitter images on the photographic film plane 30, and a focusing lens focuses the other image onto the electronic image sensor 25.

As is well known in the art, the substrate of the film 20 can have on its rear side, coated a transparent magnetic layer. Another magnetic head 38, which is under the control of head interface electronics 40 (see FIGS. 4a and 4b), can be used to read and write information to the transparent magnetic storage layer. The head interface electronics 40 provides signals to either the linear magnetic head array 36 or magnetic head 38 in a conventional manner. Although two separate arrangements will be described for the linear magnetic head array 36 and the magnetic head 38, those skilled in the art will appreciate that a single magnetic head unit can be used to provide the functions of these heads. Magnetic head 38 typically includes two tracks which correspond to data tracks C1 and C2 on the film 20. This arrangement will be discussed later in connection with FIG. 4b. For a more complete disclosure see, for example, commonly assigned U.S. Pat. No. 5,130,745, the disclosure of which is incorporated by reference.

The hybrid camera main body includes an electronic image sensor 25 arranged to coincide with the axis of the camera lens 3b, and is electrically connected to a semiconductor chip 27 mounted on a printed circuit board 26. In this embodiment, respective rear covers 28 and 29 for the film and electronic portion of the hybrid camera are independently provided. As is well understood, a cartridge receiving structure 31 is provided within the hybrid camera main body 1 and, in accordance with the present invention, can receive a cartridge which has either photographic film or magnetic tape.

In accordance with the present invention, images are taken simultaneously on two different media: photographic film and electronic image sensor 25. Although these two images are of the same scene, they are taken from different positions, and as will be described later, can be used in computing an improved image. Typically, the photographic image, which will be digitized, has a higher resolution than that of the electronic image sensor 25. These two images are digitally aligned and then processed to provide a single improved output image, as will be described.

Figure 3:
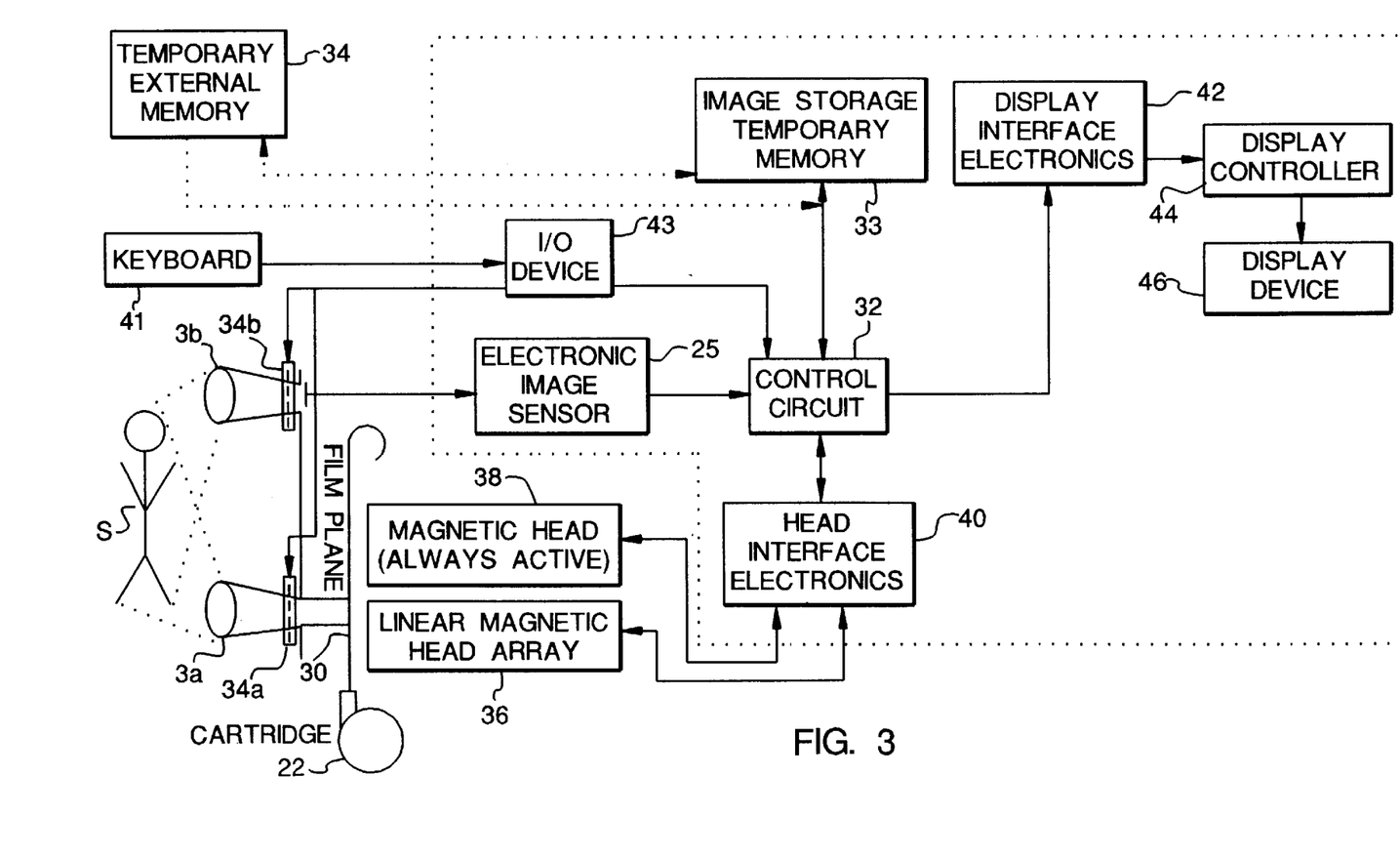
FIG. 3 is a block diagram of various elements of the hybrid camera system shown in FIG. 1.

In FIG. 3, a block diagram is shown of various systems within the hybrid camera main body 1. As shown, a subject S is positioned in front of the camera lenses 3a and 3b. An image of the subject is focused on a photographic film plane 30 by the camera lens 3a of the film cartridge 22 which contains photographic film or magnetic tape. An image of the subject S is also focused by the camera lens 3b and other optical elements (not shown) upon the electronic image sensor 25. Electronic image sensor 25 can be a full frame charge coupled device (CCD) or, alternatively, can be an interline device with, for example, photodiode pixels which are adapted to deliver charge to interline CCDs. Conventional electronic circuitry (not shown) is associated with the electronic image sensor 25. After the electronic image sensor 25 receives light representative of the image of the subject S, the circuitry sets up, acquires, and transfers electronic signals from the electronic image sensor to circuitry for digitization and image processing. Such electronics are well known in the art and their description omitted for clarity of discussion. A control circuit 32 is adapted to transfer images from an image storage temporary memory 33 to display interface electronics 42. The display interface electronics 42 causes digital images to be delivered to a display controller 44 which, in turn, causes selected images to be shown on a display device, such as a display device 46. When the image storage temporary memory 33 is fully loaded, the control circuit 32 signals to the display interface electronics 42 an appropriate signal causing the display controller 44 to display information on the display device 46 indicating to the user that the image storage temporary memory 33 is full. The user then, via the keyboard 41, makes a decision whether to transfer the images in the display interface electronics 42 or to rewind the film cartridge 22 and insert a film cartridge 22 containing magnetic tape. The arrangement of such type of a display structure is well known in the art and used on many commercially available cameras such as the Casio QV-10 digital still camera. In operation, shutter mechanisms 34a and 34b (shown schematically as dotted lines) of the hybrid camera are simultaneously operated and images of the subject S are directed to the photographic film plane 30 for recording on the photographic film and onto the electronic image sensor 25. The operation of the shutters is as best shown in FIG. 3 under the control of an input/output device 43 such that when a magnetic cartridge is loaded into the camera, the shutter mechanism 34a is disabled and prevents light from the subject from illuminating the photographic film plane 30. The linear magnetic head array 36 detects the presence of a prerecorded signal on the magnetic tape. The image storage temporary memory 33 may include transistors that can store a number of images as is well known to those skilled in the art. Each time an image is to be photographed on the film, a corresponding image is stored in image storage temporary memory 33. Another temporary external memory 34 is shown which is external to the camera itself and can either receive or deliver signals directly under the control of the control circuit 32.

The linear magnetic head array 36 is under the control of the head interface electronics 40. In accordance with the present invention, after a film cartridge 22 having a magnetic tape is inserted into the camera, the magnetic head 38 detects the presence of a film cartridge 22 having magnetic tape and provides a signal to the head interface electronics 40 that a magnetic tape is now in the camera. Under the control of a user, the keyboard 41 mounted on the camera body as shown in FIG. 1 sends signals through input/output device 43 into control circuit 32 which causes data representing images to be selectively transferred to the head interface electronics 40 which, in turn, control the writing of such image data via the linear magnetic head array 36. The keyboard 41 can also be mounted external to the camera.

More particularly, the keyboard 41 signals the control circuit 32 to transfer selected images from the image storage temporary memory 33 through the control circuit 32 and the head interface electronics 40 to the linear magnetic head array 36. The linear magnetic head array 36 records such images onto magnetic tape.

The output of the hybrid camera main body 1 is photographic film images and images of the same scenes captured at different positions by the electronic image sensor 25 which are subsequently recorded onto magnetic tape. These two media are then used to produce improved images. More particularly, corresponding images from the magnetic tape and digitized images from the photographic film are combined and processed as will be described later.

Figure 4A:
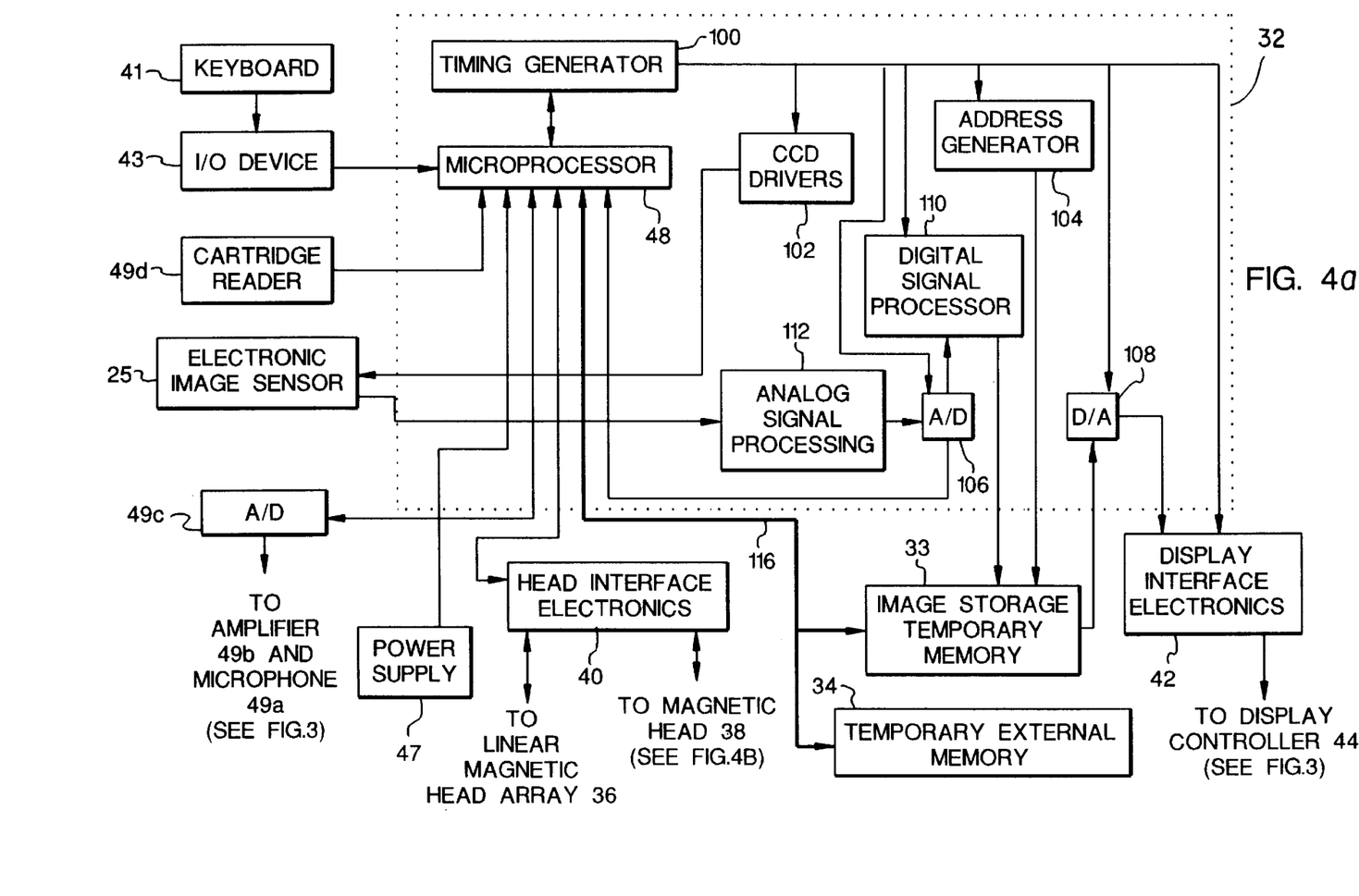
FIG. 4a and FIG. 4b perspectively show block diagrams of the control circuit 32 and the head interface electrodes.

Turning now to FIG. 4a, where a more detailed block diagram is shown of control circuit 32. The control circuit 32 is shown to receive inputs from input/output device 43, which is under the control of keyboard 41. Also shown external to the control circuit 32 are the head interface electronics 40, temporary external memory 34, and display interface electronics 42, all previously discussed with reference to FIG. 3. Moreover, a power supply 47 is shown to provide power to a microprocessor 48. The microprocessor 48 receives an input from the input/output device 43 and provides control signals to a timing generator 100. The timing generator 100 controls CCD drivers 102, an address generator 104, signal processing circuitry 110, and also provides signals to an analog-to-digital converter 106 and to display interface electronics 42, as well as to a digital-to-analog converter 108. The CCD drivers control the electronic image sensor 25 which, in turn, provides analog signals to analog signal processing circuitry 112. The analog signal processing circuitry 112 delivers signals to the analog-to-digital converter 106 delivers digital signals to digital signal processing circuitry 110. The digital signal processing circuitry 110 provides an input to image storage temporary memory 33. The address generator 104 causes digital information to be delivered either to the temporary external memory 34 or to the digital-to-analog converter 108. The digital-to-analog converter 108, under the control of the timing generator 100, provides input signals to the display interface electronics 42. In response to signals from timing generator 100, the display interface electronics 42 delivers image signals to the display interface electronics 42 shown in FIG. 3.

Figure 4B:
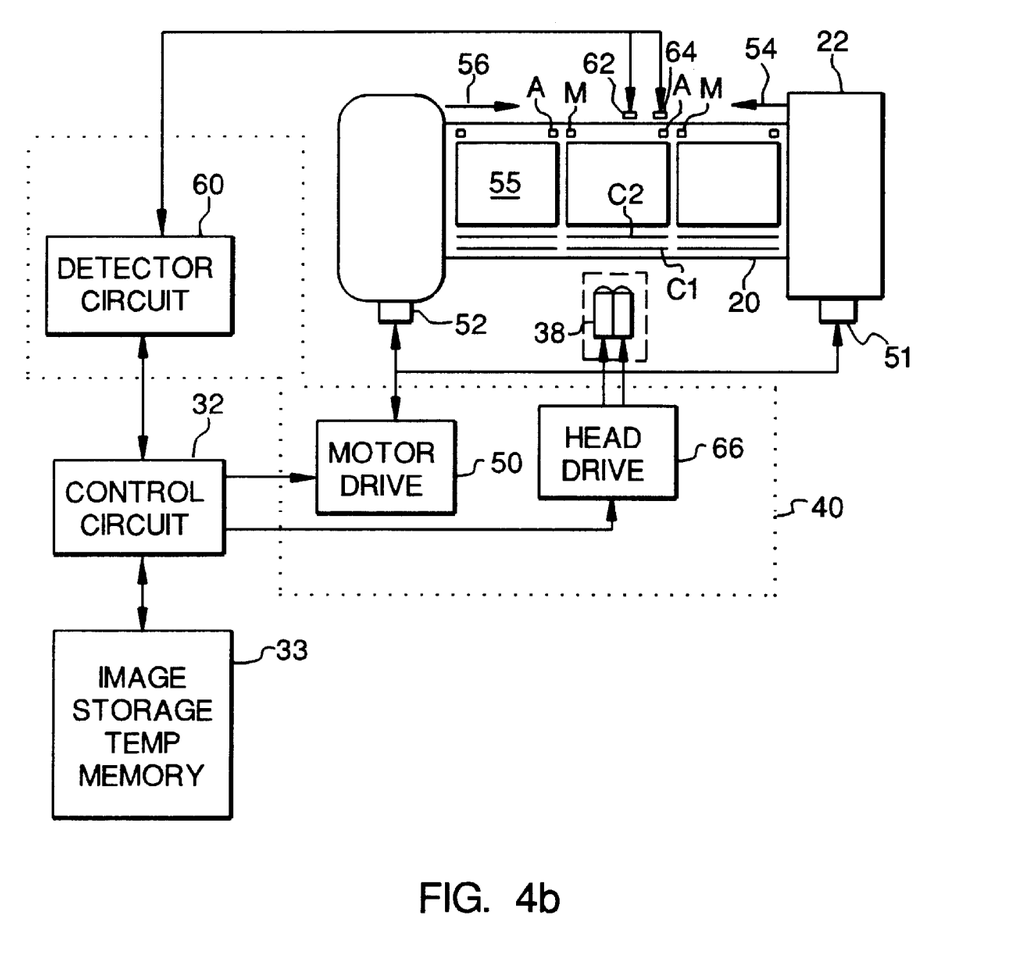

Turning now to FIG. 4b, where a more detailed block diagram shows the head interface electronics 40. In FIG. 4b, portions of the hybrid camera main body 1 associated with magnetic recording of data on film in accordance with the present invention are shown. The control circuit 32, as discussed above, controls various functions of the camera operation. Other data, such as date, time, exposure information, scene orientation, and frame format can be provided in a well known manner within control circuit 32. Image storage temporary memory 33, which can be provided by an EEPROM stores image data prior to writing it to a magnetic tape. A motor drive 50 is mechanically coupled to an internal spool 51 of the film cartridge 22 and to a take-up spool 52. The detail construction of the spools 51 and 52 are conventional. The motor drive 50 is operated under the control of the microprocessor 48 of control circuit 32 advances the film 20 in a first direction represented by arrow 54 from the film cartridge 22 to the take-up spool 52, frame by frame, after each image frame 55 is exposed. Once all frames are exposed, motor drive 50 is operative to rewind the film in a second direction represented by arrow 56 from the take-up spool 52 to the film cartridge 22 in one continuous motion. A detector circuit 60 is coupled between control circuit 32 and opto-sensors 62 and 64 to sense apertures A and M to control frame by frame advance of the film and recording data in data tracks C1 and C2. In conjunction with detector circuit 60 and control circuit 32, opto-sensor 64 serves as a metering sensor responsive to detection of metering perf M to position image frame 55 properly within the camera exposure gate (not shown). Opto-sensor 64 serves as a velocity sensor responsive to detection of anticipation perf A to sense the velocity of the film as it is being transported. Data recording in parallel longitudinal data tracks C1 and C2 is accomplished by means of magnetic head 38 driven by head drive 66 under the control of the microprocessor 48 of the control circuit 32. The details of film 20 and the magnetic recording layer thereon are fully described in aforementioned U.S. Pat. No. 5,130,745, the disclosure of which is incorporated herein by reference. For a more complete disclosure of the operation of magnetic head 38, see commonly assigned U.S. Pat. No. 5,450,149 issued Sep. 12, 1995 to Cocca entitled "Photographic Camera and Method for Recording Magnetic Data on Film", the disclosure which is incorporated herein by reference. For a more complete discussion of the film rail and gate frame structure located in hybrid camera main body 1, see U.S. Pat. No. 5,502,528, the disclosure of which is incorporated herein by reference. For a more complete description of the magnetic tape, which can be used in the present invention, see the above-identified commonly assigned U.S. patent application Ser. No. 08/672,390 filed May 29, 1996. It will be understood to include a high density ferromagnetic structure such as found in conventional video or audio tape cassettes. For an example of such a structure, see commonly assigned U.S. patent application Ser. No. 08/637,116, filed Apr. 24, 1996 to McIntyre et al entitled "A Non-Photographic Strip Having a Base Layer Similar to a Photographic Filmstrip and a Magnetic Recording Layer."

The leading edge of the magnetic tape is thrust forward from a tape supply side of film cartridge 22 which includes the internal spool 51 to the take-up side of the camera which includes take-up spool 52. The spools are under the control of the motor drive 50 which, in turn, is controlled by the microprocessor 48 within the control circuit 32.

It will be understood that, once information has been recorded in the magnetic tape, tape movement induces a change in the flux in the head gaps that causes information to be exchanged as is well known in the art. Thus, it should be clear that the linear magnetic head array 36 can operate in both a record and playback mode. The linear magnetic head array 36 provides recording signals but also is adapted to receive signals in a playback mode. As shown in FIG. 4a, in the playback mode, the head interface electronics 40 delivers data to the microprocessor 48. Thereafter, the microprocessor 48 delivers data bus 116 to either the image storage temporary memory 33 or to temporary external memory 34 for further processing as discussed above.

In operation, after a number of images have been recorded on a photographic film, an operator can operate the keyboard 41 and disable the shutter mechanisms 34a and 34b and cause the motor drive 50 to rewind the exposed film into internal spool 51 of film cartridge 22. Film cartridge 22 can now be removed from the camera and another film cartridge 22 with magnetic tape can be inserted into the camera or, alternatively, another cartridge containing photographic film can also be inserted into the cartridge receiving structure 31. In the event that an operator does not have photographic film available the operator, of course, can insert a film cartridge 22 containing a magnetic tape into the camera and record directly onto such tape.

Figures 5, 5A:
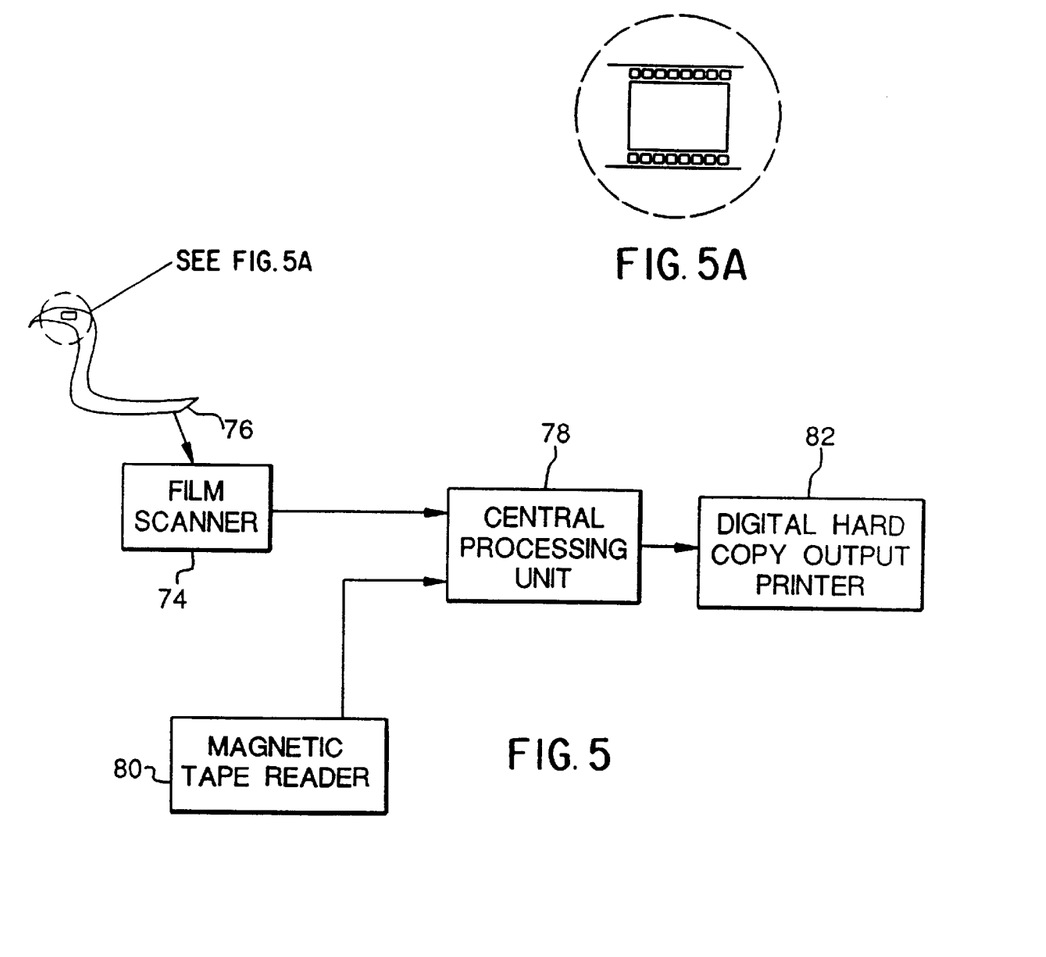
FIG. 5 is a block diagram showing a scanner for digitizing images on a photographic film and for applying such digital signals to a processing unit and a magnetic tape reader for applying corresponding stored images to the central processing unit; the central processing unit processes the images in accordance with the present invention.

Turning now to FIG. 5, a block diagram is shown having a film scanner 74 for digitizing images from a photographic film 76 produced by the hybrid camera main body 1. An example of a commercially available film scanner is RFS2035 film scanner manufactured by the Eastman Kodak Company. The film scanner 74 produces digital images of photographic images and delivers them to a central processing unit 78. The photographic film can be either a negative or a positive film. A magnetic tape reader 80 reads the digital images stored on the tape and applies these images to the central processing unit 78. Stored within the film and the magnetic images on the tape are identification numbers so that the computer can numerically correlate the images for the same scene when it performs subsequent image processing. After the computer has processed the images in accordance with present invention, it produces output signals to a digital hard copy output printer 82. Digital hard copy output printers are well known in the art and can take forms as ink jet printers, thermal printers, or the like.

Figure 6:
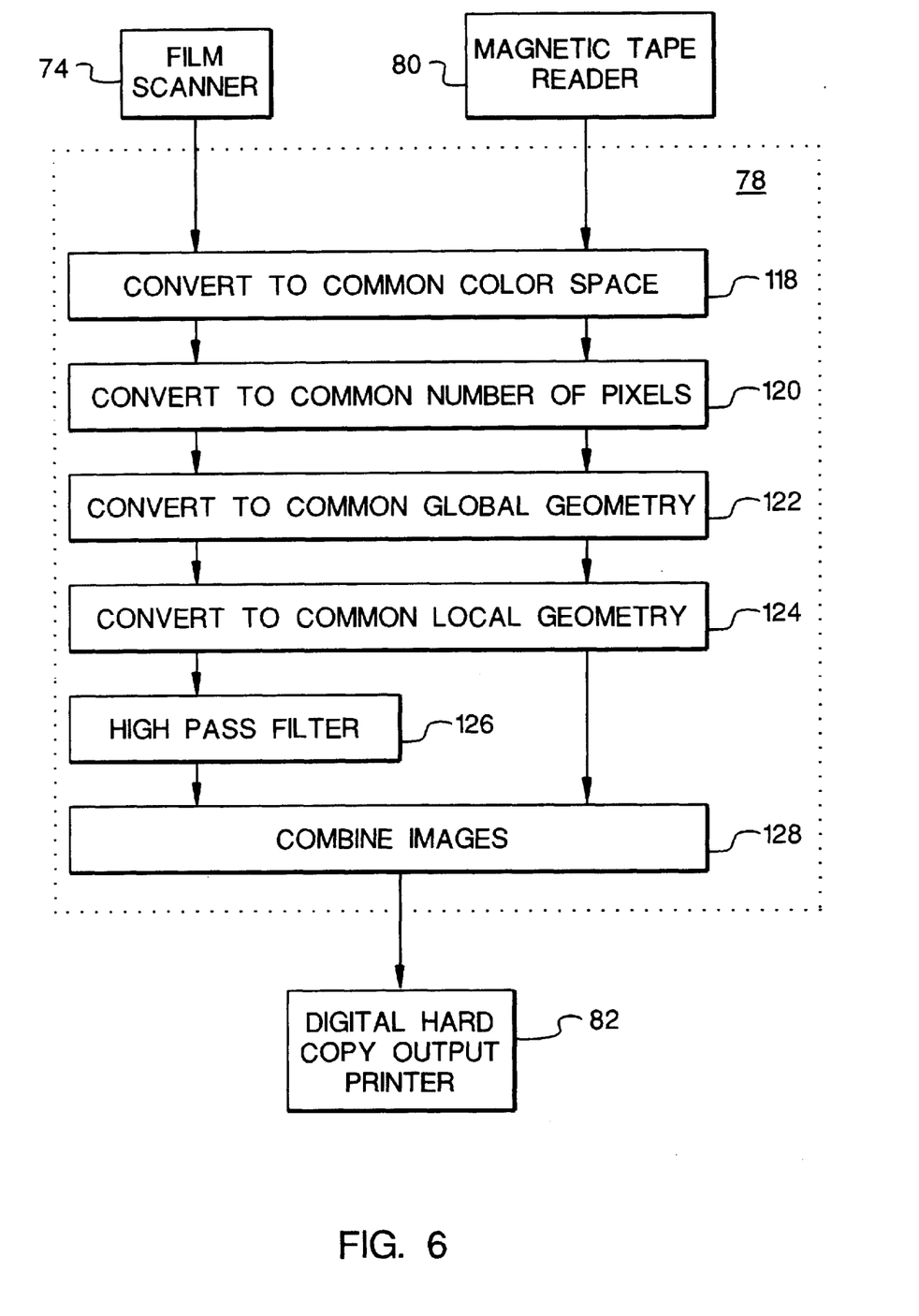
FIG. 6 is a flow chart showing in block diagram form the steps needed for the combining and image processing.

Turning now to FIG. 6 which is a block diagram showing the algorithm for producing a combined digital image having improved characteristics. First, the film image is scanned and digitized by film scanner 74 and applied to the central processing unit 78. In addition, the digitized electronic image is read by magnetic tape reader 80 and also applied to the central processing unit 78. Although this algorithm is embodied in the central processing unit 78, it will be understood that the algorithm can be stored on a computer program product such as, for example, magnetic storage media, such as magnetic discs (floppy disc) or magnetic tapes; optical storage media such as optical discs, optical tape, or machine readable barcode; solid state storage devices such as random access memory (RAM) or read only memory (ROM).

The next step is to convert both of these same scene digital images to a common color space. Although both images are digital representations of the same scene, the two capture systems, that is the film and the electronic image sensor, typically have different spectral sensitivities, hence the color information will be apportioned differently among the color channels in the two systems. Both images should be transformed into a common color space with a common tone-scale, by means of color matrices and look-up tables (see, for example, W. K. Pratt, Digital Image Processing, pp 50–93, Wiley Interscience 1978), or by means of 3-D LUTs, techniques which are well known to those skilled in the art.

In block 120 the number of pixels in each of these converted images must be substantially matched in number of pixels. In other words, there should be a common number of pixels. It, of course, will be understood that the number of pixels in the scanned photographic image is typically much higher than from the electronic image sensor. In order to provide this conversion to a common number of pixels, the image with the lower number of pixels is upsampled by, for example, the method of bi-cubic interpolation to match the number of pixels in the other image. Other types of interpolation techniques can also be used to upsample digitized images, such as spatial function fitting, convolution, and Fourier domain filtering. These are well known in the art, and described, for example, in W. K. Pratt, pp 113–116.

In block 122, corrections are now made to the digital images to correct for any difference in their global geometry, that is any geometrical transformation which, when applied to every pixel in one image, enables its geometry to be substantially mapped onto the geometry of the other. Examples of such transformations are translation, rotation, scaling, aspect ratio, and the geometrical effects of the different lens systems that are used for the photographic film and the electronic image sensor. It will be understood that this correction need be applied to only one of the images to enable it to be mapped onto the geometry of the other, and since there may be some slight loss in image quality, sharpness in particular, associated with the application of this correction, the correction would normally be applied to whichever of the digital images originally had fewer pixels at block 120. The correction will typically involve three steps. First is the generation of a set of displacement vectors, typically with sub-pixel accuracy, which characterize a local x,y displacement between the two images at certain locations in the image-pair. A variety of techniques may be suitable, including block matching, and the method of differentials, both well known in the art (Image Processing, edited by D. Pearson, Chapter 3, "Motion and Motion Estimation," G. Thomas, pp 40–57, McGraw-Hill, 1991), but the preferred technique for this application is Phase Correlation. For a more complete disclosure of phase correlation techniques, see Pearson ibid and commonly assigned U.S. patent application No. 08/1334,985, filed Nov. 7, 1994, the disclosure which is incorporated by reference herein. Phase-correlation provides a method to generate displacement vectors which is robust in the presence of noise and brightness changes in the record of the scene. The second step is the interpretation of that set of displacement vectors as a generalized geometrical transformation. Three commonly occurring transformations are described here, translation, magnification (zoom) and rotation in the plane of the image, but it will be understood that a similar process can be used to interpret all geometrical transformations of rigid bodies. In the case of translation, the transformation is defined, simply, as that x,y displacement which occurs most frequently in the set of displacement vectors. Otherwise, if two independent translation vectors are available from the vector set which map positions $(x_1,y_1)$ and $(x_2,y_2)$ in one image onto $(x_1',y_1')$ and $(x_2',y_2')$ respectively in the second image, then the following transformation may be defined:

Magnification, by a factor m (m≠1), about an origin at (a, b), is defined as $$\begin{bmatrix} m & 0 \\ 0 & m \end{bmatrix} \begin{bmatrix} x_i - a \\ y_i - b \end{bmatrix} + \begin{bmatrix} a \\ b \end{bmatrix} = \begin{bmatrix} x_i' \\ y_i' \end{bmatrix}$$

Hence, substituting the pair of translation vectors and rearranging yields $$m = \frac{x_2' - x_1'}{x_2 - x_1} \quad a = \frac{x_2' - mx_2}{(1-m)} \quad b = \frac{y_2' - my_2}{(1-m)}$$

The generalized equation for a rotation in the x,y plane about a center at (a, b) through an angle $\phi$ is $$\begin{bmatrix} \cos\phi & -\sin\phi \\ \sin\phi & \sin\phi \end{bmatrix} \begin{bmatrix} x - a \\ y - b \end{bmatrix} + \begin{bmatrix} a \\ b \end{bmatrix} = \begin{bmatrix} x' \\ y' \end{bmatrix}$$

which can be solved in a similar fashion by substituting in the translation vectors to yield a, b, $\phi$, and so on for the other transformations. The third step is the geometrical transformation of one of the pair of images according to the parameters calculated and the transformation equations given in step 2. Typically, this is achieved using phase-shifting spatial interpolation, similar to the interpolation techniques referenced above, or of the type described in commonly assigned U.S. patent application Ser. No. 08/641,709, the disclosure of which is incorporated by reference herein.

In the simplest implementation of this algorithm, the images are now combined by, for example, a numerical or geometrical average on a pixel-wise basis, as shown in block 128.

However, oftentimes local areas in the above mentioned simple combination suffer from poor quality resulting from, for example, differences in the local geometry between the two images. A simple solution to this problem is to detect these local areas, and to change the way in which the images are combined in these local areas. Specifically, where the difference between the two images, measured at each pixel location, is within a specified tolerance (depending on the inherent noise characteristics of the electronic and/or film recording media), the pixel values of the two images are averaged. Where the difference between the same-location pixel-values for the digitized film and electronic images are not within this tolerance, the pixel value for the "default" image (the default being either image—this choice is made based on measures of local noise or local sharpness, dependent on the application, but one image is used consistently as the default either for any pair of images, or for each local area within the pair of images) is picked to provide a value at that position for the resultant image.

An approach to provide improved image quality in local areas where the above mentioned tolerance is exceeded is to convert to a common local geometry, as shown in block 124. Again, it will be understood that these local corrections need be applied to only one of the images to enable it to be mapped onto the geometry of the other, and the correction would normally be applied to whichever of the digitized images originally had fewer pixels at block 120. The measurement of these differences in local geometry is achieved by techniques similar to those used for the measurement of global displacements, and involves the assignment of a displacement vector, obtained, for example by the phase-correlation technique, to each pixel in the image to be corrected. The resultant array of assigned vectors, which maps the values of each pixel in one image onto the corresponding pixel positions in the second image, is generally referred to as a vector field. The method is well known and described, for example, in Image Processing, edited by D. Pearson, Chapter 3, "Motion and Motion Estimnation," G. Thomas, pp 53–54, McGraw-Hill, 1991. The pair of images may now be combined by first correcting one image by spatial interpolation according to the vector field, then combining the two images by averaging, pixel-by-pixel, the same location pixel-values. Alternatively, it may be more efficient to perform these two steps simultaneously by performing an average of the two images on a pixel-by-pixel basis, but where the corresponding pixel positions are defined according to the vector field. It will be understood to those skilled in the art that although the above the description relates to the use of the vector field to correct for differences in local geometry between two images which have already been converted to a common global geometry, a vector field can be generated which can be used to measure and correct for differences in both the global and local geometries simultaneously.

Improved sharpness and reduced noise can be achieved by applying a high-pass filter, at block 126, to that image which contains the greater amount of high spatial-frequency information. In the case where the electronic image sensor 25 produced the image with the lower amount of high spatial-frequency information, the high-pass filter, which may be designed using well known techniques (as described, for example, in Chapter 3 of "Theory and Application of Digital Signal Processing", Rabiner & Gold, Prentice-Hall 1975), should have a spatial-frequency response which is complementary to the cascaded spatial-frequency responses of the apparatus including the electronic image sensor 25, associated optics, and subsequent spatial filtering operations to correct for pixel number and geometry. The digital images are combined in block 128 by adding the high-pass filtered digital image to the digital image which contains less information at high spatial frequencies, according to the considerations described in the previous paragraph.

As more than one representation of the scene is captured, it is possible to select scene exposure conditions in a way that provides for improving various performance characteristics.

One example arises if the electronic and film capture images are not at the same focus position. Most scenes typically have scene objects at different distances from the camera, and therefore it is often the case, particularly with large apertures (small lens f-numbers), that only part of the scene is captured in focus. By utilizing image combination as described above where, in addition, the sharper of the two differently focused images is selected, on a local basis, a combined image is produced in which more scene objects are sharper than either of the input images. In this case, the "sharper" of the two images is defined as whichever image has the higher local signal-to-noise ratio, as determined, for example, by comparing the magnitude of the high-pass filtered image to the a priori noise level for the corresponding image capture means as measured over the same band of spatial frequencies, for each of the images. Alternatively, it is possible to split each of the digitized electronic and digitized photographic images, after conversion to a common global and local geometry, into their high and low spatial-frequency components by means of digital high-pass and low-pass filters. The low frequency components of both images are combined by averaging, and the high frequency component of the sharper of the two differently focused images is selected according to the above criterion, on a local basis, and added to the low frequency combination to produce a combined image which has improved noise and sharpness performance.

A second example occurs when digitized images do not have the same depth of field. The depth of field of an image capture system is a function of both lens focal length and aperture (f-number). It may well be the case that the light sensitive area of the electronic image sensor 25 is smaller than the light sensitive area of the film. In this case, the electronic image sensor 25 utilizes a shorter focal length camera lens 3b in FIG. 3 (for the same angle of view of the scene) and, therefore, has the greater the depth of field for a given f-number. An improved performance can be achieved which is similar to that obtained when the images are captured at different focus positions; this time the difference in local sharpness (improved signal-to-noise) having resulted from capture with different depth of field (or combination of depth of field and focus position). This variation can be particularly useful in situations where large size lens apertures are used, for example, in cases of low scene illumination or when very short exposure times are required, e.g., for capturing fast moving action without image blur.

Further improvement in image performance can be achieved by utilizing alternate types of image combinations. For example, electronic image sensors (CCDs) and other electronic capture devices cannot sense and fully separate and form three independent color channels at a single capture site (CCD pixel); whereas in film, multichannel capture is possible as multiple silver halide layers can be coated on top of each other. Given this limitations CCDs and other electronic capture media typically have to apportion the total number of light sensing elements into at least three different color sensitive types (e.g. red, green, and blue; or cyan, yellow, green, and white) in order to capture a color image. Image processing algorithms are utilized to reconstruct a full color image but, fundamentally, there is a loss in spatial resolution in order to obtain a color image. If only one or two colors were captured by the electronic image capture device, then more spatial resolution would be obtained; however, by itself, this could not render a full color image. Likewise, there may be reasons (such as manufacturing costs) that a film may not capture the at least three color records required to create a full color image. In both of these cases, the images may be combined to achieve a full color image.

For example, a black and white film, or a film sensitized only to green light, could be combined with a red and blue (e.g., red blue checkerboard pattern on a CCD) electronic image to form a color image. In this case, block 118 (FIG.

6) would only provide conversion to a common intensity representation (not full color space conversion). The conversions to common global and local geometries (blocks 122 and 124) would be performed by the methods described above that apply to the full band signals (that is the methods that do not involve the use of high-pass filters) and the combine block 128 would include the process of color conversion to obtain the full color image by means of color matrices and look-up tables. Alternatively, a black and white film may be used with a full color electronic image capture device, wherein the digital images from both sources are converted to a common global and local geometry and the high frequency component of the monochrome image (obtained by means of a digital high-pass filter designed according to the criteria described above) added to the full color electronic image, to take advantage of the resolution characteristics of the film image and the noise and color characteristics of the electronic image. However, in some instances it is preferable that the electronic image sensor 25 captures black and white images and the photographic film captures colored images. The black and white image sensor provides more sensitivity in lower light and has higher spatial resolution than a color sensor since it only need capture one color.

Another further improvement in image performance is possible by utilizing additional, alternate forms for image combination. The electronic and film capture media may be chosen such that their respective relative sensitivities to light are different. For example, an electronic capture device may have high sensitivity to light, but very low spatial resolution. The film may have low sensitivity to light but very high spatial resolution. In this case, at very low light levels (in at least some portion of the scene being captured) better overall performance would be obtained by choosing the electronic image in these very low light areas of the image and the film image in the areas of the image with higher light levels. This decision would be performed by selecting in the combine block 128, the image with the better signal-to-noise (as previously defined). Alternatively, the whole of either image could be selected depending on which image exhibits the overall better performance characteristics.

The invention has been described in detail with particular reference to a certain preferred embodiment thereof, but it will be understood that variations and modifications can be effected within the spirit and scope of the invention. For example, images can be directly exposed onto the electronic image sensor 25 without any film cartridge 22 being inserted into the cartridge receiving structure 31 and, in such a case, the camera would operate as a conventional electronic camera with the exception that the stored images could be transferred onto a magnetic tape of a film cartridge 22 after such cartridge is inserted into the camera.

PARTS LIST

A apertures
B apertures
C1 data tracks
C2 data tracks
1 hybrid camera main body
3a camera lens
3b camera lens
3c collimating lens
3d focusing lens
3e focusing lens
4 beam splitter
6 focusing mechanisms
7 shutter switch
8 wind-up lever
9 shutter speed dial
10 film rewind knob
12 film sensitivity dial
16 reflex mirror
18 submirror
20 film
22 film cartridge
25 electronic image sensor
26 printed circuit board
27 semiconductor chip
28 rear covers
29 rear covers PARTS LIST (Con't)

30 photographic film plane
31 cartridge receiving structure
32 control circuit
33 image storage temporary memory
34 temporary external memory
34a shutter mechanism
34b shutter mechanism
36 linear magnetic head array
38 magnetic head
40 head interface electronics
41 keyboard
42 display interface electronics
43 input/output device
44 display controller
46 display device
47 power supply
48 microprocessor
50 motor drive
51 internal spool
52 take-up spool
54 arrow
55 image frame
56 arrow
60 detector circuit
62 opto-sensor
64 opto-sensor PARTS LIST (Con't)

66 head drive
74 film scanner
76 photographic film
78 central processing unit
80 magnetic tape reader
82 digital hard copy output printer
100 timing generator
102 CCD drivers
104 address generator
106 analog-to-digital converter
108 digital-to-analog converter 110 signal processing circuitry
112 analog signal processing circuitry
116 data bus
118 block
120 block
122 block
124 block
126 block
128 block

We claim:

1. A method of producing a digital image with improved performance characteristics, comprising the steps of:
   a) capturing a photographic image of a scene;
   b) digitizing the captured photographic image to produce a digitized photographic image;
   c) simultaneously with capturing the photographic image, capturing a digitized electronic image of the scene;
   d) globally aligning the digitized electronic image and the digitized photographic image; and
   e) locally aligning the digitized electronic image and the digitized photographic image such that when there is any misalignment in any local area, measuring and correcting for each of these locally misaligned areas of the digitized electronic and photographic images and combining the appropriately corrected images to produce a combined digital image with improved performance characteristics.

2. The method of claim 1 further including:
   i) converting both images to a common color space; and
   ii) converting both images to a common number of pixels.

3. The method of claim 1 wherein if there are any misaligned local areas, selecting a portion of either the digitized electronic image or the digitized photographic image for further processing.

4. The method of claim 1 wherein the digitized electronic image is black and white image and the digitized photographic image is a color image.

5. The method of claim 1 wherein the digitized photographic image is black and white image and the digitized electronic image is a color image.

6. The method of claim 1 wherein the combining and processing step includes high-pass filtering of whichever of the digitized electronic image and the digitized photographic image contains more information at high spatial frequencies, and combining the images by adding this high-pass filtered image to whichever image contains less information at high spatial frequencies.

7. The method of claim 1 wherein the combining and processing step includes low-pass and high-pass filtering of both the digitized electronic image and the digitized photographic images, and combining the images by first averaging the low-pass filtered images and then adding whichever of high-pass filtered images contains more information.

8. The method of claim 1 wherein the photographic image of the scene is captured by the same camera that produced the digitized electronic image of the same scene by the same camera but from a different position.

9. A computer program product for producing a digital image with improved performance characteristics from a digitized photographic image of a scene and a digitized electronic image of the same scene and having a computer program stored thereon for performing the steps of:
   a) capturing a photographic image of a scene;
   b) digitizing the captured photographic image to produce a digitized photographic image;
   c) simultaneously with capturing the photographic image, capturing a digitized electronic image of the scene;
   d) globally aligning the digitized electronic image and the digitized photographic image; and
   e) locally aligning the digitized electronic image and the digitized photographic image such that when there is any misalignment in any local area, measuring and correcting for each of these locally misaligned areas of the digitized electronic and photographic images and combining the appropriately corrected images to produce a combined digital image with improved performance characteristics.

* * * * *